W. F. BEATON.
Carriage-Window.
No. 68,154. Patented Aug. 27, 1867.
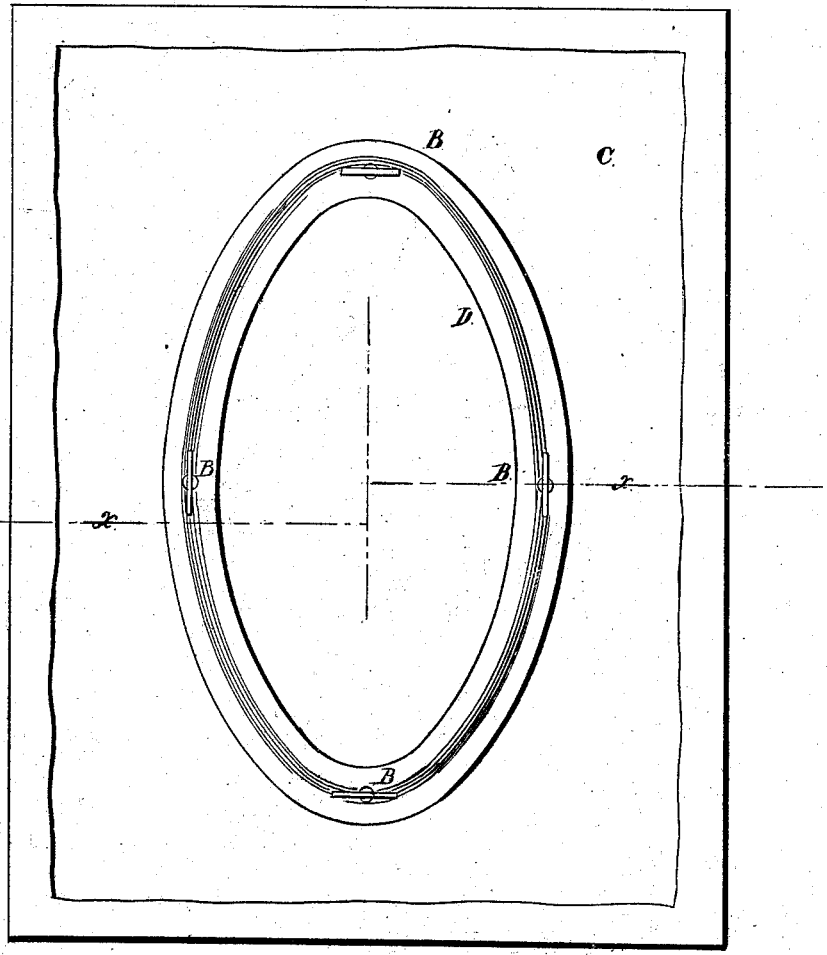
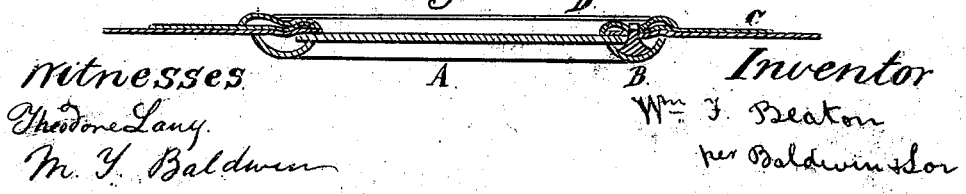

United States Patent Office.

WILLIAM F. BEATON, OF PHILADELPHIA, PENNSYLVANIA.

Letters Patent No. 68,154, dated August 27, 1867.

---

IMPROVEMENT IN FRAMES FOR THE GLASSES OF CARRIAGE-CURTAINS.

---

The Schedule referred to in these Letters Patent and making part of the same.

---

TO ALL WHOM IT MAY CONCERN:

Be it known that I, WILLIAM F. BEATON, of the city and county of Philadelphia, in the State of Pennsylvania, have invented a new and useful Improvement in Frames for the Glasses of Carriage-Curtains, of which the following is a full, clear, and exact description, reference being had to the accompanying drawings, making part of this specification, and in which—

Figure 1 represents an inside view of the carriage-curtain, showing the mode of fastening the frame which secures the glass, and Figure 2 a section through the frame on the lines $x$ $x$ of fig. 1.

Heretofore in securing glass in curtains for carriages, rivets or screw-bolts have been used to hold together the metallic frame and washer between which the glass is clamped. Both rivets and screws are objectionable, because if they pass through the frame they are unsightly, and in a short time are liable to become loosened; or they are so rigid that the jars to which the curtain is constantly subjected, while the carriage is in motion, break the glass; and besides, when a new glass is to be inserted in the frame, the rivets have to be cut or the screws removed, and in either case the frame is liable to be defaced.

It is the object of my invention to correct these defects in fastening glass in carriage-curtains; and my invention consists in soldering or brazing at convenient points, to the inner sides of the frame, thin metallic projecting strips, either singly or in pairs, and finishing the washer so as to permit the strips to pass through suitable holes made in it for that purpose, and after passing the strips through the curtain, inserting the glass, and putting the washer on the strips, which are then bent down upon the washer, so as to clamp it and the frame upon the curtain, and hold the glass between them securely. By my mode of fastening, the integrity of the ornamented surface of the frame is never disturbed. The glass is held by a slightly yielding pressure that prevents its being broken by the jolting of the carriage, and the washer can be readily removed, and a new glass inserted without removing the frame from its place.

A thin metallic concavo-convex frame, A, fig. 2, is plated or enamelled, and polished or finished with any ornamental design, and of any desired form, that of an oval being selected in this example. To the inside of the frame A, at as many points as may be desired, I cause thin metal clips B to be securely brazed or soldered. These clips may be made of single or double strips of thin, tough metal, that will bend readily without breaking, and of a length that, when standing at right angles to the plane of the plate A, will pass through the curtain C and the washer D, which is also made of thin metal, and of a yoke form, as shown in the drawings; that is to say, with a groove in its centre to conform to the cavity of the plate A, and with its edges turned up so as slightly to overlap those of the frame, being made slightly wider than the frame for that purpose, in order to clamp the curtain more securely. The washer must also have holes punched through it at suitable points to receive the clips secured to the frame. The glass being cut to the form of the frame, and the curtain being cut to the form of the glass, the frame is placed on the outside of the curtain, the glass put in it, and the clips passed through holes made in the edge of the curtain within the frame; the washer is then placed upon the inside of the curtain, the holes in the washer passing over the clips, and the clips are bent down flat upon the washer. The frame, glass, and washer will thus be held securely together, and when the glass needs replacing, it will only be necessary to straighten the clips and remove the washer, which can be replaced when the new glass is inserted, and the clips again bent to hold the glass securely, with the results before named.

I do not claim broadly fastening articles together by clips and washers, but having thus described my improved fastening, what I do claim as new, and desire to secure by Letters Patent, is—

1. As a new article of manufacture, the glass and curtain-holder, consisting of the concavo-convex plate A, washer D, and clips B, constructed and arranged as described, for the purpose set forth.

2. Fastening glass in carriage-curtains by clips secured to the frame, and bent upon a washer, substantially in the manner described.

In testimony whereof I have hereunto subscribed my name.

WILLIAM F. BEATON.

Witnesses:
WM. B. DAYTON,
W. OGLE.